UNITED STATES PATENT OFFICE.

EDWARD H. ELLIS, OF SOMERVILLE, MASSACHUSETTS, ASSIGNOR, BY MESNE ASSIGNMENTS, TO SAID EDWARD H. ELLIS, AND ALFRED D. CHANDLER, OF BROOKLINE, MASSACHUSETTS, TRUSTEES OF ELLIS BRIQUET BINDER.

FUEL-BRIQUET AND METHOD OF MAKING SAME.

1,009,961. Specification of Letters Patent. Patented Nov. 28, 1911.

No Drawing. Application filed January 18, 1911. Serial No. 603,383.

*To all whom it may concern:*

Be it known that I, EDWARD H. ELLIS, of Somerville, in the county of Middlesex and State of Massachusetts, have invented certain new and useful Improvements in Fuel-Briquets and Methods of Making Same, (Case B,) of which the following is a specification.

This invention relates to a new and useful briquet as an article of manufacture, and to the particular application of the process for making such new and useful briquet.

Heretofore the best briquets have been made with binders of coal tar pitch, or of silicates, and of oil, but the smoke and the odor from such binders have impaired their usefulness and sale.

This invention provides a fuel briquet free from the aforesaid objections, and which is cohesive, waterproof, odorless, smokeless, retains its form in the fire, has a high calorific efficiency, and is comparatively inexpensive to manufacture.

In carrying out my invention, I first produce a composition containing sulfuric acid, starch and water, or their reaction products. This composition is then incorporated with comminuted fuel and the composition is then mechanically pressed into the form of briquets; the briquets are then subjected to calorific action of a certain temperature through the medium of a specially designed and regulated oven.

The composition may be in the proportions of three (3) lbs. of sulfuric acid, preferably of a concentration in excess of ninety per cent., nine (9) lbs. of starch and three (3) gallons of water, this total quantity of composition being then used in the proportions of one hundred and twenty-five (125) lbs. of composition to one (1) ton of comminuted fuel. I do not, however, limit myself to these specific proportions. The starch, instead of being pure, or the commercial product sold as starch, may be any natural or manufactured product containing sufficient starch to effect the same result as commercial starch.

When the composition and fuel have been thoroughly incorporated by suitable machinery, the briquets are made into any desired form, preferably under such a pressure as the graded requirements of combustion demand. The briquets are then subjected to a process of final elimination of moisture, and simultaneously to a process of induration and waterproofing, through the added binding operation of caloric upon the chemical ingredients employed in the composition, these effects being produced by a suitably arranged oven kept at a temperature of about two hundred (200°) C. and through which the passage of the briquets is regulated for from ten (10) to about fifteen (15) minutes, the degree of the heat and the duration of the transit in the oven being governed by the kind of service for which the briquets are intended. Under these conditions the starch is dehydrated and carbonized by the sulfuric acid, with the result that an insoluble, strong, rigid and highly efficient binder is formed throughout the mass of the fuel.

I have found in practice that such briquets are not only hard enough to bear transportation and handling, but that they are also waterproof, and are odorless and smokeless during combustion. Also, that they possess a high calorific efficiency and preserve their form in the fire, the outer portion during combustion presenting of course some ash, which, however, is crowded off, but leaving the inner and unconsumed portions still hard enough to sustain the weight of fresh fuel above, and to preserve their form during "slicing" of the fire.

One of the chief reasons why my improved briquets are economical to manufacture is that the chemicals specified so combine as to reduce to the minimum the time and degree of heat applied to render them hard and waterproof, the carbonization of the starch by the sulfuric acid occurring at a comparatively low temperature.

Comminuted bituminous or soft coal made into briquets with my improved composition and treatment, is as hard as anthracite coal, and burns without the annoying smoke nuisance usually resulting from the use of soft coal.

Briquets manufactured under my invention have the equivalent weight value of hard coal, but without cinder loss because of the complete combustion of the briquets.

I claim:

1. A waterproof briquet manufactured of comminuted fuel and a composition including an insoluble, carbonized reaction product of sulfuric acid and starch.

2. A waterproof briquet manufactured of comminuted fuel mixed with a composition containing an insoluble, carbonized reaction product of sulfuric acid, starch and water, the said fuel and composition being mixed, shaped and baked.

3. A waterproof briquet manufactured of comminuted fuel, and an insoluble, carbonized reaction product of sulfuric acid and starch rendered hard and waterproof by heat.

4. The method of making waterproof fuel briquets, consisting in mixing with comminuted fuel a composition containing an insoluble, carbonized reaction product of sulfuric acid, starch and water, forming the mixture into briquets under pressure, and then subjecting the briquets to the action of heat to render them hard and waterproof.

In testimony whereof I have affixed my signature, in presence of two witnesses.

EDWARD H. ELLIS.

Witnesses:
A. M. Harrison,
P. W. Pezzetti.

Copies of this patent may be obtained for five cents each, by addressing the "Commissioner of Patents, Washington, D. C."